June 23, 1959  A. W. REINHARDT  2,891,787
COMBINATION PAPER BOARD AND SLIP-ON PLASTIC
TIP SPRING LINER CONSTRUCTION
Filed Oct. 31, 1956
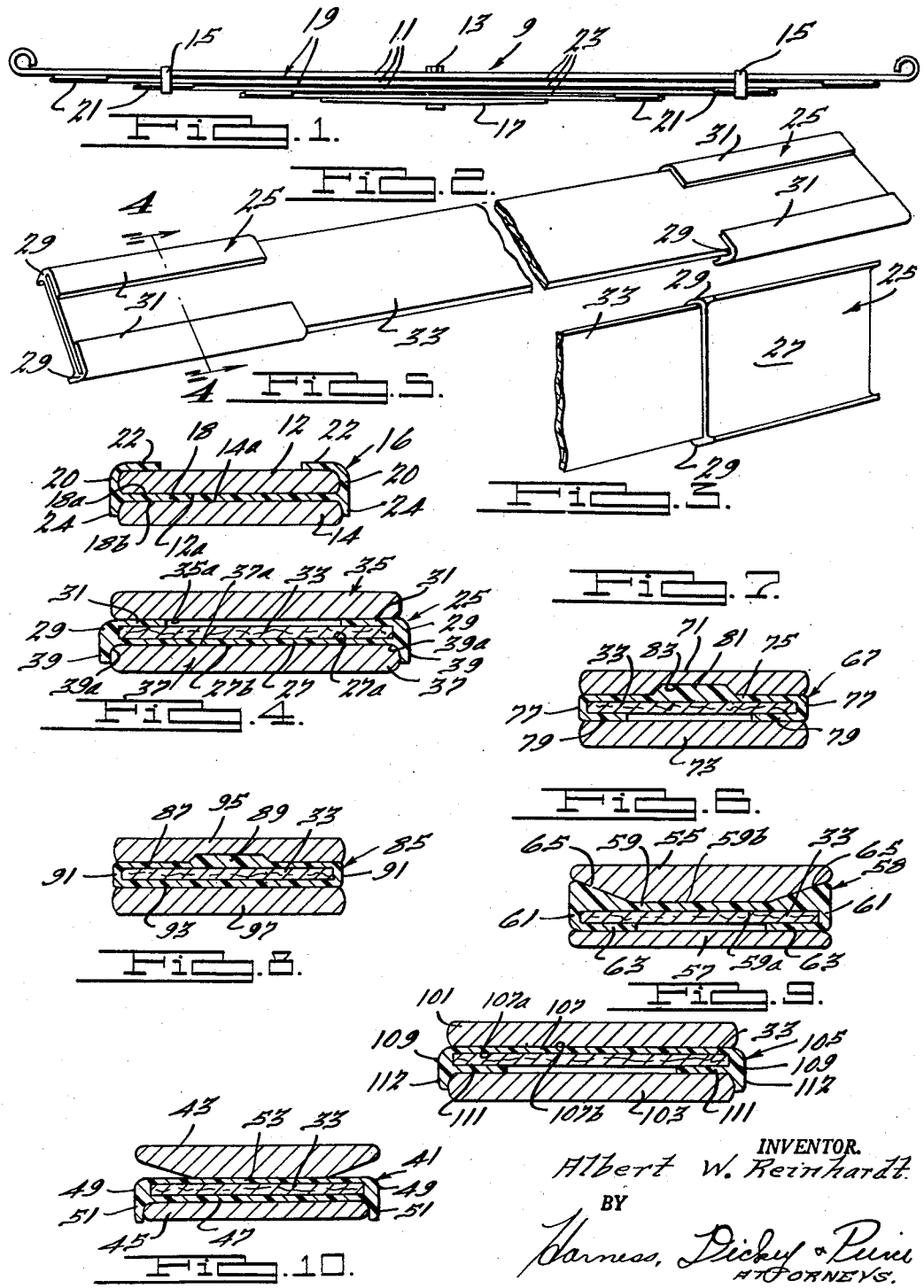
INVENTOR.
Albert W. Reinhardt
BY
Harness, Dickey & Pierce
ATTORNEYS.

United States Patent Office 2,891,787
Patented June 23, 1959

2,891,787

COMBINATION PAPER BOARD AND SLIP-ON PLASTIC TIP SPRING LINER CONSTRUCTION

Albert W. Reinhardt, East Detroit, Mich., assignor to Detroit Gasket and Manufacturing Company, Detroit, Mich., a corporation of Michigan Application October 31, 1956, Serial No. 619,524

5 Claims. (Cl. 267—49)

This invention relates to combination paper board and slip-on-type plastic tip spring liner constructions for use in multiple leaf spring assemblies, particularly leaf springs on automotive vehicles.

The extremities of the superposed leaves of a leaf spring bear the greatest load during flexure particularly at the higher amplitudes of vibration and heretofore it was taught, for example U. S. Patent 2,105,869 to Thompson, that to insure smooth riding qualities at both high and low amplitudes of vibration, the surfaces of the spring liner which contact areas adjacent the outer ends of a spring leaf must be formed of a friction producing material while the intermediate spring contacting surfaces of the liner must be formed of a friction reducing material. It has since been found that, on the contrary, it is necessary to provide friction reducing or anti-friction surfaces at the extremities of the superposed leaves of a leaf spring assembly.

Accordingly an important object of the present invention is the provision of an improved spring liner construction which provides durable anti-friction surfaces between superposed leaves of a leaf spring assembly over limited areas at the extremities thereof in an improved form having means integral with said surfaces for fixedly retaining them, principally by frictional engagement, in place during all amplitudes of vibration encountered in use.

Other important objects of the invention are to provide an improved spring liner construction in the form of a low-cost combination paper board liner and a pair of durable plastic tip members adapted and intended to slidably engage over their lengths opposite ends of said liner; to provide improved means in the form of a structure integral with the plastic tip members for securing them to the paper board liner principally by frictional engagement thereof; to provide integral longitudinally extending bosses on said members for retaining the combination in place between superposed leaves of an operating leaf spring assembly; and to provide a construction of plastic tip members retained principally by frictional engagement wherein each has an internal configuration which conforms as closely as possible with the cross-sectional dimensions of a member of a multiple leaf spring assembly and wherein said integral structure and said bosses can be simply formed in an extrusion process.

Still another object of the invention is to provide an improved leaf spring assembly comprising a plurality of superposed leaves having interposed between each pair of superposed spring leaves except the lowermost pair, a pair of plastic tip members each of which has an internal configuration conforming as closely as possible with the cross-sectional dimensions of a member of the assembly and which is retained thereon principally by frictional engagement.

The above and related objects will become apparent during the course of the following description taken in conjunction with the accompanying drawings.

In the drawings:

Figure 1 is an elevational view of a spring leaf assembly in loaded condition having the improved spring liner construction embodying the present invention interposed between pairs of superposed leaves;

Fig. 2 is a perspective view, shown broken, of one form of spring liner construction embodying the present invention;

Fig. 3 is a fragmentary perspective view of one end of the structure of Fig. 2 showing the opposite face thereof;

Fig. 4 is a transverse sectional view taken along the line 4—4 of Fig. 2 showing also in section a pair of superposed spring leaves between which the spring liner construction of Fig. 2 is interposed;

Fig. 5 is a transverse sectional view through one end of a pair of superposed spring leaves having a pair of improved plastic tip members embodying the invention engaged about the upper leaf of the pair; and Figs. 6 through 10 are transverse sectional views each of different embodiments of spring liner construction according to the present invention shown interposed between a pair of superposed spring leaves also in section.

Briefly and in a broad aspect, the invention is embodied in a pair of plastic members of special construction which provide durable anti-friction surfaces of limited area interposed between a pair of superposed leaves of a multiple leaf spring assembly adjacent the ends thereof so as to contact both of the opposing faces of the pair of spring leaves. The pair of plastic tip members have a width at least as great as the width of the superposed leaves and a special internal configuration whereby they are retained in place principally by frictional engagement in the leaf spring assembly during all amplitudes of vibration encountered in use. In its preferred form each of the plastic tip members is of a plastic material found to be pre-eminently satisfactory from the standpoint of wear resistance and friction reducing properties. The invention is also embodied in an improved spring liner construction comprising a low-cost paper board liner functioning in combination with the pair of plastic tip members to reduce friction, though to a lesser extent, over the central and major portion of the spring leaves. The paper board liner has a width always less than the maximum length of the plastic tip members. For securing the plastic tip members to the paper board liner frictional engagement between the latter and the tip members is principally relied upon as each of the tip members is adapted to slidably engage over its length an end of the paper board liner. The structure by which this is accomplished is integrally formed on each tip member and provides an internal configuration therefor which conforms as closely as possible to the cross-sectional dimensions of the paper board liner for maximum frictional engagement. The integral structure on the plastic tip members also functions to prevent displacement of the combination laterally from between the pair of superposed spring leaves during flexure of the assembly. The particular integral structure on each plastic tip member which defines the said internal configuration and provides the means for retaining the combination in place during use is dictated by a number of considerations, e.g., the type of spring leaves to be accommodated, the extent of the anti-friction surfaces desired adjacent the ends of the spring leaves and with this, the correlative consideration, viz., the total amount of plastic material required and hence the cost of the combination. It is a feature of the invention that the integral structure on the plastic tip members in the embodiments of spring liner construction to be described in greater detail hereinafter can be formed in a continuous extrusion process. In all of the embodiments the plastic tip members provide full face anti-friction surfaces over their lengths in sliding contact with at least one of the opposing faces of the pair of spring leaves between which the spring liner construction is interposed. In some of the embodiments the integral structure is in the form inturned flange members which provide less than a full face anti-friction surface over their lengths in sliding contact with the other of the opposing faces of the pair of spring leaves and in others the separate flange members are united so that the plastic tip members are actually hollow and provide full face anti-friction surfaces over their lengths in sliding contact with both of the opposing faces of the pair of spring leaves. For retaining the combination in place between the pair of spring leaves, especially for preventing displacement of the combination laterally thereof during use, longitudinally extending boss portions are integrally formed on the tip members for cooperative engagement with certain areas of the spring leaves. As has been indicated, the plastic tip members may be employed without a paper board liner to frictionally engage in its stead one of the pair of superposed spring leaves at opposite ends thereof in which instance they would function as inserts rather than as part of the construction of a full length spring liner.

In co-pending application of C. J. Motycka and J. P. McMahon, S.N. 619,480, filed October 31, 1956, and now abandoned, assigned to the same assignee as the instant application, there is described and claimed a similar spring liner construction wherein the tip members are made of superior plastic material which is also usable to great advantage in the present invention but which is claimed in the referred to co-pending application in combination broadly with flexible means which have anti-friction surfaces and which join the tip members to retain them interposed between a pair of superposed spring leaves adjacent the ends thereof.

Referring now to the drawings in more detail, and particularly to Fig. 1, a conventional multiple leaf spring assembly, generally designated 9, is shown in loaded condition which comprises a plurality of individual leaves 11 superposed one above the other and secured at their centers as is standard practice by a center post 13. The uppermost and longer leaves of the assembly 9 are secured near each of their extremities by a rebound clip 15 of well-known construction. Between each pair of superposed leaves except the lowermost pair, of which the relatively short stub leaf 17 is one, is interposed the improved spring liner construction embodying the present invention, indicated generally at 19, and comprising anti-friction plastic tip members, generally designated 21, disposed adjacent the ends of the superposed leaves, as shown, in combination with and secured to opposite ends of a paper board liner, generally designated 23.

The plastic tip members must possess certain characteristics to qualify as a suitable tip material so as to realize the advantages of the invention. The plastic tip material must have a low coefficient of friction with respect to the metal surfaces of the leaf spring with which it is in sliding contact, it must be available at low cost, be highly resistant to abrasion, be impermeable to water, oils, greases, etc., and it must remain flexible and retain its anti-friction and anti-squeaking properties under extremes of temperature.

Surprisingly only one group of materials out of the myriad of materials available and commonly classified as plastic materials has been found which really satisfactorily fulfills these requirements as far as spring liners are concerned. More will be said of this one group of materials later. Relatively few other plastic materials which are commercially competitive with this one material have been found which at most are usable merely. These will be mentioned hereinafter. At this time, it is desired to point out that the term plastic or plastic material as used throughout the specification and in the appended claims has a very definite and distinct meaning as far as the purposes of the present invention are concerned. In its broadest form it is inclusive only of those materials which fall within one major group of the generic class of organic synthetic resins. Organic synthetic resins can be divided into the following major groups: (1) amphorous or crystalline, solid, flexible, non-elastic polymeric organic materials; (2) amphorous or crystalline, solid, rigid, non-elastic polymeric organic materials; and (3) amphorous, semi-solid polymeric organic materials. Only those materials which fall within the first-mentioned of the above enumerated groups are included in the term plastic or plastic material as used herein. Natural resins and inorganic synthetic resins are excluded. There is another generic class of somewhat similar materials which are not usable and therefore excluded by the term and that is the class of elastomers either natural or synthetic which are amphorous, solid, flexible, elastic, polymeric organic materials.

Actually it has been found, as previously indicated, that relatively few materials within the said first-mentioned group which otherwise qualify from a cost standpoint are even usable for the purposes of the present invention. When such materials are used in combination with a paper board liner between superposed leaves of a leaf spring, it has been observed that the combination does have the effect of some improvement in the riding qualities of the vehicle on which the leaf spring is employed but it is seriously deficient in other important considerations. These few materials of the many tested which have been found to be usable are ordinary polyethylene and the acrylonitrile butadiene styrene copolymer type of synthetic resin, specific examples of which are Kralastic, a product of Naugatuck Chemical Division, and Cycolac, a product of Marbon Chemicals. Ordinary polyethylene seizes and abrades and is not capable of long wear life while Kralastic and Cycolac are better from this standpoint. Of the latter two, Kralastic has been found to be superior but at the lower temperatures which are often encountered in use for some unexplained reason it causes squeaking of the leaf spring assembly. Mention should be made of two materials which have been found to possess the requisite anti-friction properties but their cost at the present writing is prohibitive. These two materials are Teflon and Mylar (trade names) which are polytetra-fluoroethylene and ethylene glycol terphthalate type synthetic resins, respectively. To include these presently known usable materials and such other materials as may in the future qualify both from a cost standpoint and as to satisfactory properties for use in combination with a paper board liner as a spring liner construction the above broad definition of the term plastic or plastic material is employed herein.

However the use in combination with a paper board liner of the said one group of materials has produced results so far outstanding as to place them in a class by themselves for the purposes of the present invention. This one group of materials is of relatively recent origin and sufficient details of their properties and process of manufacture will be set forth to distinguish them from other similar materials. Hereinafter they will be referred to as low pressure, high density linear olefines which term includes copolymers of the type.

Low pressure, high density polyolefines are crystalline polymers which have been termed isotactic polymers and in which the molecules are highly oriented. These polymers are of the basic formula

in which alkyl groups are oriented with respect to the asymetric carbon atoms. The polyolefines are made by a relatively new low pressure polymerization technique with special catalysts. At the present writing low pressure, high density linear polyethylene is commercially available while the higher homologues thereof are in the experimental stage of development. For example, low pressure, high density linear polypropylene has been made (U.S. Patent 2,692,257) but is not as yet commercially available.

The low pressure high density linear polyolefines will be described with reference to the polyethylene member of this series of olefines. Low pressure high density linear polyethylene has a very low coefficient of friction, is available at low cost and is extrudable. The last mentioned property is of special significance because the shape of the plastic tip members of the present invention adapts them for continuous production in extrusion processes which effects substantial economies. Low pressure high density linear polyethylene is exceptionally resistant to abrasion, is impermeable to water, oils and greases and retains its flexibility, anti-friction and anti-squeaking properties at extremes of temperature. It is ideally suited for the purposes of the present invention and exceptionally superior riding qualities of automotive vehicles have been observed from its use as the material of the improved construction of plastic tip members embodying the invention.

Low pressure, high density linear polyethylene differs from oridinary polyethylene in both chemical and physical properties; these differences being brought about by its method of manufacture which is a relatively new process of polymerizing ethylene at low pressures with heterogeneous catalysts that fall in the broad category of metal-alkyls and metal halides. Chemically it has a longer chain highly oriented molecular structure with a minimum of branching and a more uniform molecular weight distribution of its polyethylene chains. Ordinary polyethylene has a short chain highly branched and random molecular structure. Physically, low pressure high density linear polyethylene has a higher softening point, greater density, more rigidity and higher tensile strength than ordinary polyethylene. Low pressure high density linear polyethylene has a softening point of the order of greater than 250° F., a tensile strength in the range of 2,800 to 5,500 p.s.i. and a specific gravity between about 0.93 and 0.96 while in contrast ordinary polyethylene has a softening point of about 200° F., a tensile strength in the range of 1,500 to 1,700 p.s.i. and a specific gravity of about 0.92. Low pressure, high density linear polyethylene is now available under the trade names: "Super Dylan" and "Supermodulene," products of Koppers Co. Inc., "Marlax 50" a product of Philips Petroleum Company, and "Hyfax," a product of Hercules Powder Company. The physical properties of a specific example of a low pressure high density linear polyethylene material, viz., Supermodulene-6600 (a trade name) are as follows: molecular weight about 45,000, softening point about 260° F., tensile strength between 4,000 and 5,000 p.s.i., and specific gravity about 0.94.

The paper board liner is of a conventional paper board material or may be a Kraft resin board. Examples of suitable paper board liners are No. 1791, Kraft PRD–15 resin boards and 2401 chip board manufactured by Consolidated Paper Company, Inc. The paper board liner is impregnated with a good grade of wax, preferably one containing carnauba or montan wax in combination with a hydrocarbon wax to impart low friction properties and water resistance. During use, the wax forms a durable, low friction coating on the liner from sliding contact with the opposing metal surfaces of the pair of superposed spring leaves between which the liner is interposed. While a low friction coating is thus formed on the paper board liner, it has a higher coefficient of sliding friction with respect to the said metal surfaces than the plastic tip members.

The thickness of the paper board liner is not critical and in the usual case is about ⅛" thick. The thickness of the plastic tip member likewise is not critical and, exclusive of the longitudinally extending integral boss portions, the plastic tip members can be equal in thickness to that of the paper board liner or of a different thickness. The thickness of the longitudinally extending integral boss portions will vary depending upon the type of spring liner assembly to be accommodated.

Referring now to the embodiment of spring liner construction shown in Figs. 2 through 4, the plastic tip members, generally designated 25, have rectangular body portions 27 which provide full face anti-friction surfaces in sliding contact with the same opposing face of one of the pair of superposed spring leaves between which the spring liner construction is interposed. In this embodiment the spring liner construction is shown in Fig. 2 in the position in which it is normally placed between a pair of superposed spring leaves, i.e., with the body portion 27 in contact with the opposing face of the lowermost leaf of the pair of spring leaves. It will be apparent that depending upon the type of leaf spring assembly to be accommodated, the spring liner construction can be inserted between the pair of spring leaves in an inverted position from that shown in Fig. 2.

Depending from opposite side edges of the body portion 27 and extending the length thereof are integral portions 29 which terminate in inturned flange members 31 spaced from the inside face 27a of the body portion 27 a distance substantially equal to the thickness of the paper board liner 33 to which the plastic tip members 25 are secured. The paper board liner 33 is wax impregnated as described and flat throughout its length. Each plastic tip member has an internal configuration formed by the inside face 27a of the body portion 27 and the inside surfaces of the integral portions 29 and the flange portions 31 which conforms as closely as is practicable with the cross-sectional dimensions of the paper board liner 33. Each of the plastic tip members 25 is slidably engaged over one of the opposite ends of the paper board liner and retained thereon by frictional engagement which desirably is at a maximum within the dimensional tolerances of the materials used. Unexpectedly it has been found that the plastic tip members are not disturbed from their position on the paper board liner during flexure of the spring assembly at any of the amplitudes of vibration encountered in use. This is thought to be due to the very low coefficient of friction of the anti-friction surfaces presented by the plastic tip members when they are made of low pressure high density linear polyethylene. Even when other merely usable plastic materials are employed, the tendency for the plastic tip members to move relative to the paper board liner is not very great. Substantial savings in assembly costs are realized when additional fastener means for securing the plastic tip members 25 to the paper board liner 33 are not employed but in some instances they may be necessary.

Fig. 4 is a transverse sectional view of the embodiment of spring liner construction of Fig. 2 showing associated therewith a pair of superposed spring leaves. The upper and lower leaves are indicated at 35 and 37 respectively and have opposing faces 35a and 37a. The opposing faces 35a, and 37a, of the spring leaves 35, 37 adjacent the ends thereof are in sliding contact respectively with the anti-friction surfaces provided by the external surfaces of the flange members 31 and the outside face 27b of the body portion 27. Full face sliding engagement with the opposing face 37a and less than full face sliding engagement with the opposing face 35a is thus provided by the plastic tip member 25 of this embodiment. Full face sliding engagement with both of the opposing faces 35a, 37a over the central and major portions thereof is provided by the lesser friction reducing surfaces of the paper board liner 33. It has been found that for many applications less than full face sliding engagement between the areas adjacent the ends of the opposing face of one of each pair of spring leaves and the high anti-friction surfaces of the flange members 31 on the plasic tip members 25 is adequate and some savings in material costs of the plastic tip members can be realized.

For preventing displacement of the combination laterally from between the pair of superposed spring leaves during flexure of the assembly a boss portion is provided which is in the form of separate rib members 39 formed integrally with opposite side edges of the body portion 27 of each plastic tip member 25 and extending longitudinally over the length thereof. The rib members 39 project from the outside face 27b of the body portion 27, and are adapted to engage opposite side edges of one of the pair of superposed spring leaves. In the instance shown the rib members 39 engage opposite side edges of the lower spring leaf 37 and the inside surfaces of these members, as at 39a, are generally of concave contour to conform to the shape of the upper side edges of the spring leaf 37.

As previously indicated, the invention is also embodied in a pair of plastic tip members which may be secured to one of the pair of superposed spring leaves adjacent opposite ends thereof without employing a paper board liner. Fig. 5 is a cross-sectional view through a pair of superposed spring leaves 12, 14 having opposing faces 12a, 14a, respectively. The plastic tip members one of which is shown in Fig. 5 and indicated generally at 16 are slidably engaged about the upper spring leaf 12. The body portion 18 of each plastic tip member 16 is rectanglar as in the previous embodiment, the inside face and the outside face of which are designated 18a, 18b, respectively, and integral portions 20 join opposite edges of the body portion 18 longitudinally over the length of each plastic tip member 16. The integral portions 20 project from the inside face 18a of the body portion 18 and terminate in a pair of flange members 22. The internal configuration of each plastic tip member 16 formed by the inside face 18a and the inside surfaces of the integral portions 20 and the flange members 22 conforms as closely as possible to the cross-sectional dimensions of the upper spring leaf 12 so that the pair of plastic tip members 16 are retained thereon with a maximum of frictional engagement. The inside face 18a is in stationary contact with the opposing face 12a of the upper spring leaf 12 while the outside face 18b of the body portion 18 is in sliding contact with the opposing face 14a of the lower spring leaf 14. In the instance shown the boss portion is in the form of separate longitudinally extending rib members 24 formed integrally with the opposite side edges of the body portion 18 and depending therefrom outwardly of the extenral face 18b as in the previous embodiment. The same arrangement is provided for the other pairs of superposed leaves of the leaf spring assembly except the lowermost pair. Thus a pair of plastic tip members 16 is frictionally engaged about the uppermost leaf of each of these pairs. For example, the external surfaces of the flange members 22 provide less than full face sliding contact with the lowermost leaf of the pair of superposed leaves (not shown) just above the pair of spring leaves 12, 14 shown in Fig. 5 Similarly the lower face of the spring leaf 14 will be in less than full face sliding engagement with the external surfaces of the flange members (not shown) on the pair of plastic tip members engaged on the uppermost leaf of the pair of spring leaves (not shown) just below the pair shown in Fig. 5. Unexpectedly it has been found that during use of the leaf spring assembly the pairs of plastic tip members remain in stationary contact with the spring leaf about which each pair is engaged with no noticeable tendency to shift position. It will be apparent as the description proceeds, that the other forms of plastic tip constructions shown in combination with paper board liners with which they constitute other embodiments of the invention can be slidably engaged over a spring leaf and employed without a paper board liner as shown for the particular construction of plastic tip member in Fig. 5.

The embodiment of spring liner construction shown in Fig. 10 is quite similar to that of the embodiment shown in Figs. 2 through 4 except that the plastic tip members provide full face anti-friction surfaces in sliding contact with both of the opposing faces of the pair of superposed spring leaves. In Fig. 10 the cross section of a pair of superposed leaves of an elliptical-type spring leaf assembly is shown with the spring liner construction of this embodiment interposed. The upper spring leaf 43 has sides which taper inwardly and downwardly and is thicker in cross section than the rolled-type lower leaf 45 with which it is usually associated. The plastic tip member 41 in this instance is provided with a body portion 47, integral portions 49, and depending longitudinally extending rib portions 51 all of the same general construction as that previously described except that instead of the integral portions 49 terminating in separate flange members, they are united in a second body portion 53 spaced from the first-mentioned body portion 47. The opposing faces of both of the pair of spring leaves 43, 45 are in full face sliding contact with the anti-friction surfaces provided by the body portions 53, 47 respectively. It should be noted that this embodiment shows the versatility of the invention in accommodating all of the various types of commercially used leaf spring assemblies. The plastic tip member 41 is hollow and provided with a continuous internal configuration formed by the inside surfaces of the body portions 47, 53 and the integral portions 49. The inside surfaces of each tip member as thus defined engages the total perimeter of the paper board liner when it is slidably engaged over its length with one of the opposite ends of the paper board liner 33 to form the combination spring liner construction as previously described. Where greater sliding contact with anti-friction surfaces in the transverse dimensions is required for special applications the plastic tip members can be modified in their construction as in the embodiment of spring liner construction next to be described.

In the embodiment of spring liner construction shown in Fig. 6 the plastic tip members thereof are specially constructed to accommodate a spring leaf assembly made up of a plurality of superposed spring leaves each pair of which consists of an elliptical-type spring leaf, as at 55, superposed over a relatively thin rolled-type spring leaf 57. The plastic tip member of this embodiment is indicated generally at 58 and has a rectangular body portion 59 extending the width of the member 58 but of normal thickness only over a limited extent thereof. The inside face of the body portion is designated 59a and the outside face 59b. A boss portion projects from the outside face 59b and is in the form of a pair of spaced longitudinally extending rib members 65 integral with opposite side edges of the body portion 59 as shown. The rib members 65 are of a thicker cross section of plastic material than the boss portion on the plastic tip members of the previous embodiments so as to engage the angularly disposed opposite sides of the parabolic spring leaf 55. The sides of the rib members 65 are substantially flat and taper downwardly and inwardly from the outer edges of the plastic tip member 58. As in some of the previous embodiments integral portions 61 depend from the inside face of the body portion and terminate in inturned flanges 63 for providing the internal configuration by which the members are frictionally retained on the paper board liner. In this embodiment the width of each plastic tip member is approximately equal to the width of the superposed leaves 55, 57.

In the embodiment of spring liner construction shown in Fig. 7 the plastic tip member, indicated generally at 67, is shown frictionally retained on the paper board liner 33 in place between upper and lower spring leaves 71, 73, respectively. The plastic tip member 67 in this embodiment is provided with a body portion 75, integral portions 77 and separate flange members 79 constructed and arranged as previously described. Extending outwardly from the outside face of the body portion 75 is a boss portion which is in the form of a single longitudinally extending rib member 81 disposed centrally widthwise of the tip member 67 and provided with a shape to conform with a longitudinally extending groove permanently formed in one of the pair of spring leaves. In the instance shown the upper leaf 71 is provided with a groove, as at 83, which engages the rib member 81.

The embodiment of spring liner construction shown in Fig. 8 comprises a paper board liner 33 and a pair of plastic tip members one of which is shown in cross section therein and generally designated 85. The tip member 85 is provided with a body portion 87 from the outside face of which projects a boss portion in the form of a single longitudinally extending rib member 89 and integral portions 91 which depend from the inside face of the body portion 87 all of which are constructed and arranged as described for the corresponding parts on the tip members of the previous embodiment. In this embodiment however, the integral portions 91 are joined by a second body portion 93 spaced from the inside face of the first body portion 87 the thickness of the paper board liner 33 about which the tip members are secured. The body portions 87, 93 provide full face anti-friction surfaces in sliding contact with the opposing faces of the pair of superposed spring leaves 95, 97 adjacent the ends thereof.

In Fig. 9 a cross-sectional view of another embodiment of spring liner construction is shown interposed between a pair of superposed spring leaves 101, 103. The plastic tip members of this embodiment are indicated generally at 105 and slidably engage opposite ends of a paper board liner 33. Each as can be seen for the single one shown has a rectangular body portion 107 the inside and outside faces of which are designated 107a and 107b, respectively. In this instance the integral portions 109 joining opposite edges of the body portion 107 depend from the inside face 107a and terminate in inturned separate flange members 111. The boss portion of this embodiment is in the form of separate rib members 112 formed integrally in this instance with the integral portions 109 where they join the separate flange members 111. The rib members 112 thus project from the external surfaces of the separate flange members 111 and engage opposite side edges of the lower spring leaf 103, the inside surfaces of the rib members being contoured to conform to the shape of the upper side edges of the spring leaf 103. The external surfaces of the flange members 111 of the pair of plastic tip members 32 provide less than full face sliding contact with the opposing face of the lower spring leaf 103 while the outside faces 107b of the body portions 107 provide full face sliding contact with the opposing face of the spring leaf 101.

Combination paper board and plastic tip spring liners constructed as described were installed in an automotive vehicle spring leaf assembly and tested in a drop-weight machine. In the test the assembly was continuously subjected to alternate loading and unloading and the spring liner constructions were inspected following these tests. It was observed that the plastic tip members remain secured to the paper board liner in the position in which they were placed before the test and showed very little wear. Road tests were conducted employing the spring liner constructions embodying the present invention interposed between all but the lowermost pair of superposed leaves of the spring leaf assembly of a 1955 Pontiac automobile (a trade name) and the same result was noted, i.e., the plastic tip members remained in place on the paper board liners throughout the road test.

It will thus be seen that there has been provided by this invention both an improved plastic tip construction and an improved spring liner construction in which the objects hereinabove set forth, together with many thoroughly practical advantages, are successfully achieved. It will be understood that the invention is susceptible to modification, variation and change without departing from the spirit thereof or the scope of the appended claims.

What is claimed is:

1. A spring liner construction adapted to be interposed between a pair of superposed leaves of a leaf spring assembly comprising the combination of a paper board liner of extended length capable of flexing with said assembly, and a pair of plastic tip members each having an internal configuration conforming to the cross sectional dimensions of said liner, said members frictionally engaging over their lengths said liner adjacent opposite ends thereof, each of said members having a body portion and full length integral portions depending from opposite side edges of said body portion, and full length means integral with said integral portions spaced from the inside face of said body portion and disposed substantially parallel thereto, the inside surfaces of said integral portions and said means being in stationary contact respectively with opposite side edges and one of the opposite faces of said liner, and with said inside face in stationary contact with the other of the opposite faces of said liner, whereby the outside faces of the body portions of said members are adapted for full face sliding engagement with the same opposing face of one of said pair of spring leaves and the external surfaces of said means are adapted for sliding engagement with the same opposing face of the other of said pair of spring leaves.

2. A spring liner construction adapted to be interposed between a pair of superposed leaves of a leaf spring assembly comprising the combination of a paper board liner of extended length capable of flexing with said assembly, and a pair of plastic tip members each having an internal configuration conforming to the cross sectional dimensions of said liner, said members frictionally engaging over their lengths said liner adjacent opposite ends thereof, each of said members having a body portion and full length integral portions extending from opposite side edges of said body portion and terminating in full length inturned separate flanges members, said flange members being spaced from the inside face of said body portion and disposed substantially parallel thereto, the inside surfaces of said integral portions and said flange members being in stationary contact respectively with opposite side edges and one of the opposite faces of said liner, and with said inside face in stationary contact with the other of the opposite faces of said liner, whereby the outside faces of the body portions of said members are adapted for full face sliding engagement with the same opposing face of one of said pair of spring leaves and the external surfaces of said flange members are adapted for sliding engagement with the same opposing face of the other of said pair of spring leaves.

3. In a multiple spring assembly, a spring liner construction interposed between a pair of superposed leaves, said spring liner construction comprising the combination of a paper board liner of extended length capable of flexing with said assembly, and a pair of plastic tip members, each having an internal configuration conforming to the cross-sectional dimensions of said liners, said members frictionally engaging over their lengths said liner adjacent opposite ends thereof, each of said members having a body portion and full length integral portions extending from opposite side edges of said body portion, and full length means integral with said integral portions spaced from the inside face of said body portion, and disposed substantially parallel thereto, the inside surfaces of said integral portions and said means being in stationary contact respectively with opposite side edges and one of the opposite faces of said liner, and with said inside face in stationary contact with the other of the opposite faces of said liner, whereby the outside faces of the body portions of said members are in full face sliding engagement with the same opposing face of one of said pair of spring leaves and the external surfaces of said means are in sliding engagement with the same opposing face of the other of said pair of spring leaves.

4. In a multiple spring assembly, a spring liner construction interposed between a pair of superposed leaves, said spring liner construction comprising the combination of a paper board liner of extended length capable of flexing with said assembly, and a pair of plastic tip members, each having an internal configuration conforming to the cross-sectional dimensions of said liners, said members frictionally engaging over their lengths said liner adjacent opposite ends thereof, each of said members having a body portion and full length integral portions extending from opposite side edges of said body portion, and terminating in full length inturned separate flange members, said flange members being spaced from the inside face of said body portion, and disposed substantially parallel thereto, the inside surfaces of said integral portions and said flange members being in stationary contact respectively with opposite side edges and one of the opposite faces of said liner, and with said inside face in stationary contact with the other of the opposite faces of said liner, whereby the outside faces of the body portions of said members are in full face sliding engagement with the same opposing face of one of said pair of spring leaves and the external surfaces of said flange members are in sliding engagement with the same opposing face of the other of said pair of spring leaves.

5. A multiple leaf spring assembly comprising a plurality of superposed spring leaves, a spring liner construction interposed between each pair of superposed leaves except the lowermost pair, each spring liner construction comprising a pair of plastic tip members, each having an internal configuration conforming to the cross-sectional dimensions of said liner, said members frictionally engaging over their lengths said liner adjacent opposite ends thereof, each of said members having a body portion and full length integral portions extending from opposite side edges of said body portion and full length means integral with said integral portions spaced from the inside face of said body portion and disposed substantially parallel thereto, the inside surfaces of said integral portions and said means being in stationary contact respectively with side edges and one of the opposite faces of said liner, and with said inside face in stationary contact with the other of the opposite faces of said liner, whereby the outside faces of the body portions of the members of each pair are in full face sliding engagement with the same opposing face of one leaf spring of said each pair of spring leaves and the external surfaces of said means are in sliding engagement with the same opposing face of the other spring leaf of said each pair of spring leaves.

References Cited in the file of this patent

UNITED STATES PATENTS

| | | |
|---|---|---|
| 2,660,425 | Davis | Nov. 24, 1953 |
| 2,667,347 | Jacobs | Jan. 26, 1954 |
| 2,708,111 | Sturtevant | May 10, 1955 |
| 2,735,672 | Bradley | Feb. 21, 1956 |